United States Patent [19]
Lee et al.

[11] Patent Number: 5,076,742
[45] Date of Patent: Dec. 31, 1991

[54] HINGE DRILLING JIG

[75] Inventors: Leonard G. Lee, Ottawa; Frank A. McLean, Oxford Station; Gary W. Lacoste, Nepean; Timothy C. Frank, Ottawa; Lloyd Sevack, Nepean; Darquise D. Bradette, Manotick, all of Canada

[73] Assignee: Lee Valley Tools Ltd., Ottawa, Canada

[21] Appl. No.: 659,602

[22] Filed: Feb. 21, 1991

[51] Int. Cl.$^5$ .............................................. B23B 47/28
[52] U.S. Cl. ................................ 408/112; 408/115 R; 408/226
[58] Field of Search .................... 408/14, 97, 103, 110, 408/112, 115 R, 202, 226

[56] References Cited

U.S. PATENT DOCUMENTS

| | | | |
|---|---|---|---|
| 2,763,299 | 9/1956 | Cerf, Jr. ......................... | 408/115 R |
| 3,241,453 | 3/1966 | Baldwin .......................... | 408/115 R |
| 3,362,447 | 1/1968 | Elder, Jr. ........................ | 408/112 |
| 4,027,992 | 6/1977 | Mackey, Jr. et al. ............... | 408/112 |
| 4,594,032 | 6/1986 | Warburg ......................... | 408/115 R |

FOREIGN PATENT DOCUMENTS 2058613 4/1981 United Kingdom ............ 408/115 R

OTHER PUBLICATIONS

Page 25 from the Fall 1990 Williams Tool & Hardware Supply Catalog.
Instruction booklet that accompanies the Ericksen Enterprises hinge boring tool.

*Primary Examiner*—Daniel W. Howell
*Attorney, Agent, or Firm*—Kilpatrick & Cody

[57] ABSTRACT

A hinge drilling jig for use in the "32 mm" or face-frameless system of cabinet construction for locating and drilling the hinge cup and the hinge cup mounting screw holes to be drilled in a cabinet door. A flat bottom drill bit is slideably retained in a jig body for drilling the hinge cup hole, and two thumbscrews locate the jig on the face of the cabinet door relative to its vertical edge. A collar retains the drill bit in the body and a shoulder on the drill bit and annular rings cut on the shank of the drill bit allow measurement of the depth of the hinge cup hole prior to being drilled by the drill bit. A plurality of countersinks on the body locate the position of the hinge mounting screw holes on the face of the cabinet door in predetermined positions. The jig is held in position on the door by a handle or a clamping arm having a clamping screw and a gauge assembly locates the jig on the face of the cabinet door relative to the second edge.

10 Claims, 3 Drawing Sheets

HINGE DRILLING JIG

BACKGROUND OF THE INVENTION

This invention relates to the 32 millimeter ("mm") cabinetmaking system, which is a highly structured approach to cabinet construction. The 32 mm system is used primarily in kitchen cabinets and is often referred to as frameless construction due to the lack of a traditional face-frame. The system was developed in Europe as a means to mass produce wooden cabinet components in a factory, ship the components disassembled to the construction site, and assemble the cabinets on-site with ease.

Standard cabinet hinges used in the 32 mm system consist of two main components: the hinge plate, and the hinge member cup. The hinge plate joins the hinge member cup and is mounted on the inside of the cabinet by screws inserted into two of the 5 mm fixture mounting holes which have been drilled previously during construction of the cabinet. The inside of the cabinet door receives the hinge member cup, which must be recessed into the door and most often requires a 35 mm blind hole to be drilled in the door. Two screws secure the recessed hinge member cup to the door.

Because of the sheer number of holes required for the average cabinet by the 32 mm system, and the dependence of the fit and finish of the cabinet on the accurate size and position of the construction holes, the 32 mm system does not lend itself very well to being used where hand drilling is the only drilling method available. Large cabinetmaking shops use expensive computer numerically controlled ("CNC") machines to cut and drill out cabinet panels at phenomenal speeds. However, the cost of reprogramming the CNC machine and the resulting down-time is prohibitive in small volume production.

The next alternative is less expensive pneumatically controlled machines. The set-up time for a pneumatically controlled machine, although a fraction of what its CNC counterpart requires, still represents a substantial amount of time and is prohibitive in producing cabinets in small volumes, is still too expensive for a small shop producing low volume, custom cabinets, and is simply out of the question for the industrious homeowner willing to tackle the manufacture of his or her own kitchen cabinets.

A final alternative is to hand drill all holes. This option is inexpensive and requires virtually zero set-up time. However, because of the accuracy needed with the 32 mm system, hand drilling is not a viable alternative unless some sort of jig is used.

One prior art jig is made by Fisch Precision Tools. The Fisch jig is usable to drill a 35 mm hole, and has a fence and a clamp. Adjustment of the fence on the Fisch jig must be accomplished with an external rule, which increases the likelihood of inaccurate hole placement. The shank of the bit used in the Fisch jig is round, which does not transmit as much torque without slipping as a hexagonal shank, and does not contain a quick release feature. The depth control of the Fisch devise consists of two nuts locking against one another, which does not provide an easily readable depth gauge and positive stop. Furthermore, the Fisch device has no provision for drilling the hinge mounting screw holes and has no measuring device for quickly locating the jig on the door face.

A second prior art jig is made by Ericksen Enterprises Ltd. The Ericksen jig has a fence that is adjustable only at discrete intervals of 3, 5 or 7 mm. The Ericksen jig also uses a collar for depth control, but does not provide a depth gauge and requires drilling test holes to properly adjust the collar. Finally, the Ericksen hinge jig will locate the hinge mounting screw holes in only one position which limits the style of hinge where the jig can be used.

SUMMARY OF THE INVENTION

The present invention is a device for accurately drilling all the holes necessary for installing hinges on cabinet doors using the 32 mm system. The hinge jig of the present invention is a simple, lightweight, inexpensive device which can be easily used by the small cabinet shop owner or the homeowner. The hinge drilling jig comprises generally a body that includes a lower plate and an upper bridge. During use, the plate lies flat against the back face of the workpiece. The plate is penetrated by a fairly large diameter hole. The bridge arches over the plate and has a smaller diameter hole coaxial with the plate hole. A sleeve bearing is pressed through the bridge hole to receive the shank of a 35 mm or other size flat-bottom (blind) drill bit and to appropriately constrain the depth of travel of the drill bit. The shank of the drill bit is inserted through the bearing by threading the shank through the plate hole until the cutting head of the drill bit is positioned generally within the plate hole. Once the drill bit is installed, a return spring is placed over the shank of the drill bit and over the upper part of the bearing. The spring and the drill bit are held in place by a combination hexagonal adaptor/stop, which is inserted over the end of the shank and secured by two setscrews.

The fence of the jig is comprised of two large thumbscrews. The shanks of the thumbscrews, which have a 1 mm thread pitch, fit into threaded holes in the side of the jig body on either side of the plate hole. The centerline of the central bore is so located that when a 35 mm blind drill is inserted, the fence-forming thumbscrews are fully screwed into the jig body so that the heads of the thumbscrews rest against the jig body, and the jig is placed so that the inside of the heads of the thumbscrews are tight against the vertical edge of a door to be drilled, the outermost edge of the 35 mm drill bit will just touch the edge of the door being drilled. Unscrewing the thumbscrews from the jig body causes the jig body (and hence, the drill bit) to move away from the door edge at the rate of 1 mm for each revolution of the thumbscrews.

The jig is located in relation to the top or bottom end of a door being drilled by use of a measuring gauge which locks onto the jig by a frictional-fit button. In a first embodiment, a clamp arm with a ball socket containing a threaded foot secures the jig to the door. In a second embodiment, the jig is held against the door during drilling by the use of a handle.

The jig body also has four pairs of dimples or countersinks arranged on the plate around the plate hole to correspond to the mounting screw location of the majority of 32 mm system hinges on the market. These dimples are not drilled through, allowing the jig user to drill holes in only those countersinks which fit the particular hinges used. If more than one type of hinge is used, multiple sets of the countersinks can be drilled through.

A provision is made for drilling the holes necessary for flap hinges, which require the hole bored by the 35 mm bit to overlap the edge of the door, by the use of a 10 mm thick spacer. This spacer allows the 35 mm boring bit to overlap the door edge by up to 10 mm. The amount of overlap can be reduced by adjustment of the fence-forming thumbscrews.

The hinge drilling jig of the present invention eliminates both the expense of the CNC and pneumatic systems and the accuracy problems of hand drilling by allowing the hinge cup hole and the associated hinge cup mounting screw holes to be drilled using one simple jig. The present invention allows for the accurate hand drilling all holes necessary for mounting hinges on cabinet doors using the 32 mm system, is easily assembled and located on the door to be drilled, can be quickly adapted to a wide variety of cabinet and hinge designs, and is easily affordable by the small shop owner or the homeowner.

Accordingly, one objective of the present invention is to provide a device that permits the accurate hand drilling all holes necessary for mounting hinges on cabinet doors using the 32 mm system.

Another objective of the present invention is to provide an inexpensive device for accurately hand drilling all holes necessary for mounting hinges on cabinet doors using the 32 mm system that is easily and quickly set-up.

Another objective of the present invention is to provide a device that is easily and quickly adaptable to a wide variety of 32 mm system cabinet and hinge designs.

Still another objective of the present invention is to provide a device for accurately hand drilling all holes necessary for mounting hinges on cabinet doors using the 32 mm system that is suitable for a low volume cabinetmaking shop or a homeowner.

Other and further objectives of the present invention will become apparent from the detailed description and claims which follow.

DETAILED DESCRIPTION OF THE DRAWINGS

Figure 1:
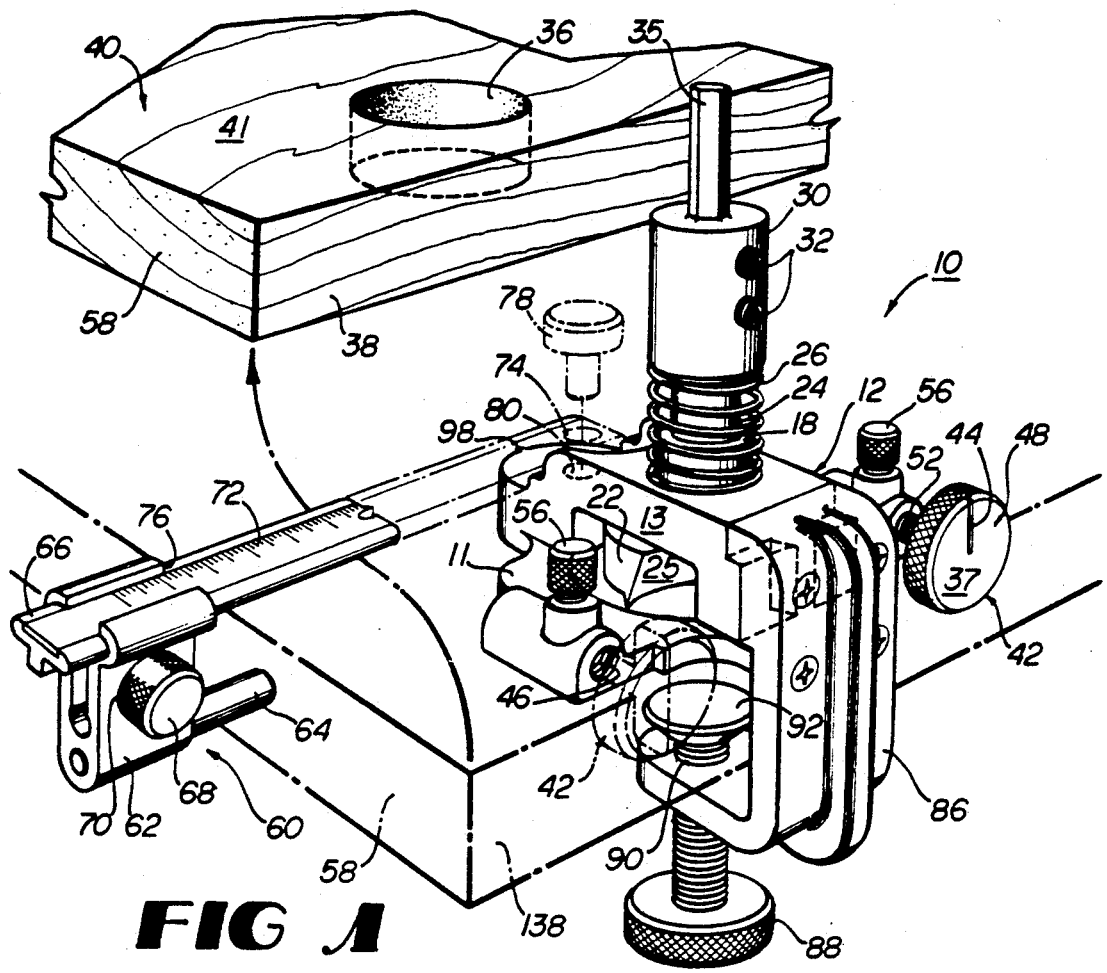
FIG. 1 is a perspective view the hinge drilling jig of the present invention positioned on a door panel to be drilled.
Figure 2:
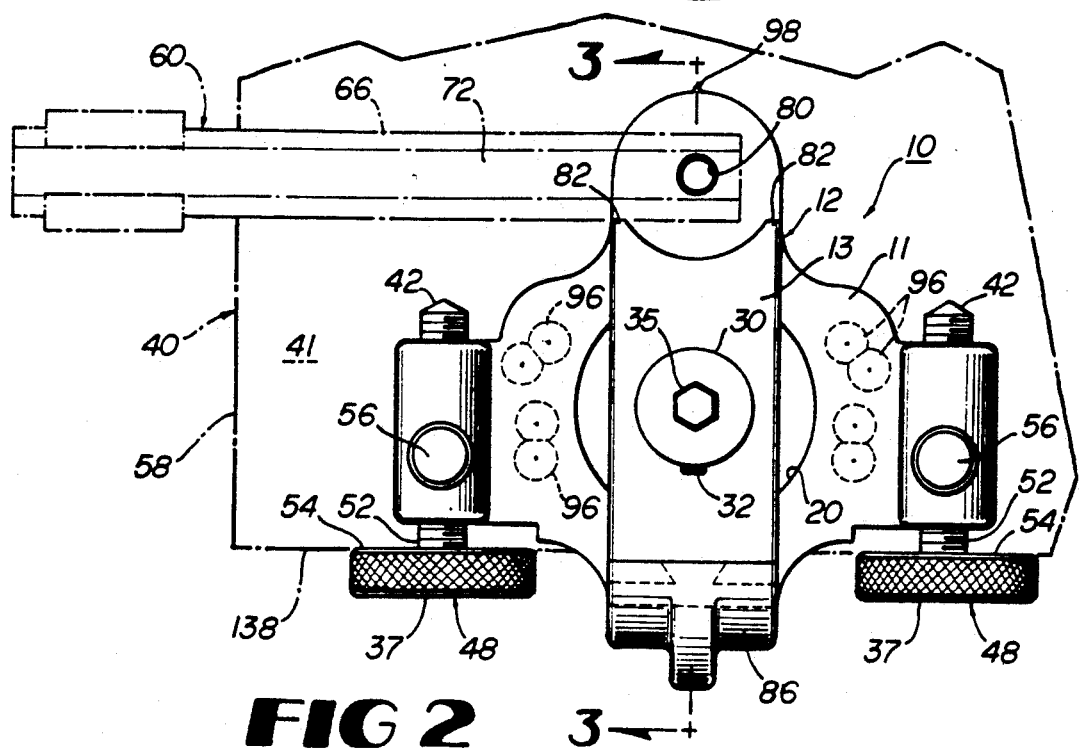
FIG. 2 is a plan view of the first embodiment of the hinge drilling jig shown in FIG. 1.

Hinge drilling jig 10, illustrated in FIGS. 1, 2, 3, 4, 5 and 6 is comprised of a body 12 having a lower plate 11, an upper bridge 13 and is preferably made of aluminum or another suitable alloy or composite material. Plate 11 has a large diameter bore 20. Bridge 13 arches across plate 11 and has a smaller diameter bore 16 coaxial with bore 20. Bore 16 receives a sleeve bearing 18, which is preferably made of brass, but other suitable materials such as aluminum or nylon may also be used. The upper portion 28 of bearing 18 protrudes above bridge 13. Bore 20 and bore 16 permit body 12 to receive a drill bit 22 with shank 24 inserted through bearing 18 so that drill bit head 25 is received within bore 20 when bit 22 shank 24 is fully inserted into bearing 18. Drill bit 22 preferably drills a 35 mm or 26 mm hole and may be a conventional steel or a carbide-tipped bit.

Shank 24 of bit 22 is inserted through bearing 18. A coiled steel spring 26 is placed over shank 24 so that spring 26 encircles the upper portion 28 of bearing 18 while bearing against bearing 18 lip 14. Bit 22 is retained within body 12, and the upper end of spring 26 bears against, collar 30, which has a bore 31 on one end that receives and is locked onto shank 24 by setscrews 32. Shank 24 may have a flat surface (not shown) machined on it to receive setscrews 32, thereby allowing more torque to be transmitted to shank 24. Hexagonal adapter 35 on the other end of collar 30 is fitted into the chuck of a drill (not shown), allows more torque to be applied to bit 22 and permits bit 22 to be used in combination with a quick release chuck (not shown).

Figure 4:
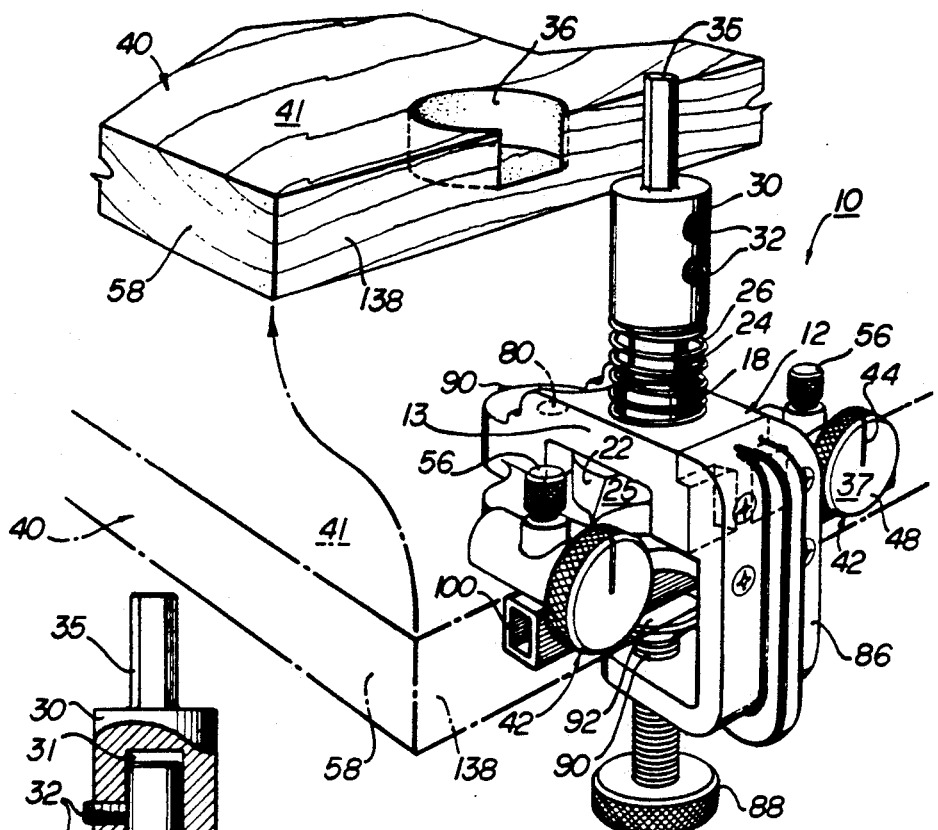
FIG. 4 is a perspective view of the first embodiment of the present invention similar to FIG. 1 with the jig positioned o the door with a spacer in order to drill a mounting hole that overlaps the edge of the door panel being drilled.
Figure 3:
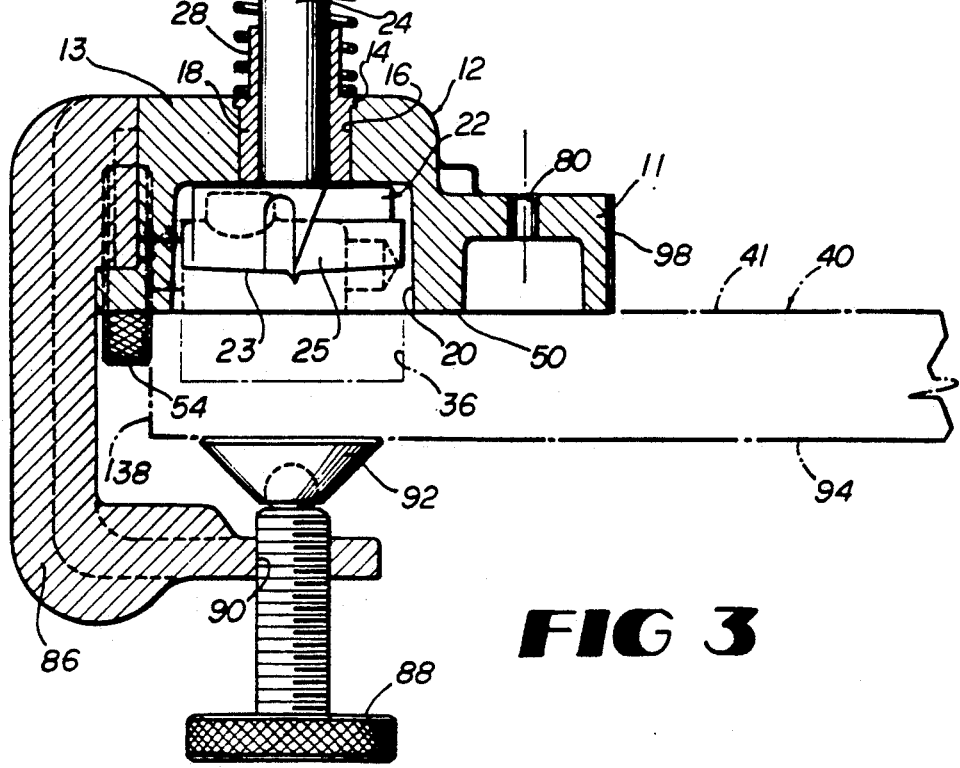
FIG. 3 is a right side elevation view, in section, of the first embodiment of the hinge drilling jig taken along line 3—3 of FIG. 2.

As is illustrated in FIG. 4, the depth of hole 36 to be drilled is determined by use of collar 30 in combination with bit 22 and annular rings 34 contained on shank 24. Bit 22 is constructed so that with bottom face 23 of bit 22 resting on upper face 41 of door 40 and collar 30 installed so that it rests against shoulder 38 of bit 22, only 10 mm of shank 24 will be exposed between upper portion 28 of bearing 18 and collar 30. Consequently, bit 22 may be lowered only 10 mm into door 40 before collar 30 contacts upper portion 28 and hole 36 will be drilled exactly 10 mm deep. (Although 10 mm is the shallowest hole required for any hinge currently on the market, other bits 22 which would drill a hole less than 10 mm can also be used). If hole 36 is to be deeper than 10 mm, annular rings 34, which are spaced 1 mm apart, can be used to locate the position of collar 30 so that the desired depth is obtained. Presently, no 32 mm system hinge manufacturer requires the depth of hole 36 to be greater than 16 mm. Therefore, six annular rings 34 are generally sufficient, however additional annular rings 34 can be provided if holes 36 deeper than 16 mm are desired. In use, the bottom of collar 30 is aligned with the annular ring 34 which corresponds to the depth of hole 36 desired rather than with shoulder 38. Collar 30 is then prevented from further movement on shank 24 by tightening setscrews 32.

Once the depth of hole 36 is set, jig 10 is positioned relative to the edge 138 of the door 40 being drilled. This distance is set by use of a pair of fence-forming thumbscrews 42, which are preferably made of brass and contain marks 44 on the outer face 37 of thumbscrew head 48 to indicate their rotational position. Each thumbscrew 42 threads into a hole 46 on the side of body 12 so that thumbscrew head 48 protrudes below the bottom 50 of plate 11. Threads 52 of thumbscrew 42 may conveniently be on a 1 mm pitch.

In use, thumbscrews 42 are screwed clockwise into holes 46 until the inside faces 54 of heads 48 contact body 12. Jig 10 is then placed so that bottom 50 rests flat against the top face 41 of door 40 and inside faces 54 of heads 48 contact edge 138 of door 40. In this position, if jig 10 is used with a 35 mm bit 22, the outermost edge of hole 36 will just intersect with edge 138. In other words, hole 36 will have a zero setback from edge 138. If hole 36 needs to be moved away from edge 38, thumbscrews 42 are rotated counterclockwise, which moves heads 48 away from body 12. Because body 12 moves in the direction opposite to the movement of heads 48, unscrewing thumbscrews 42 causes body 12 to move away from edge 138 of door 40 when inside faces 54 are held tight against edge 138. Body 12 can be easily positioned because threads 52 have a 1 mm pitch. For each counterclockwise rotation of thumbscrew 42, as gauged by the number of revolutions of marks 44, body 12 will move 1 mm away from edge 138. Once thumbscrews 42 are set so as to properly position body 12, clamping screws 56 are tightened to prevent further movement of thumbscrews 42.

Once jig 10 is properly positioned relative to edge 138 and the proper depth of hole 36 has been set, jig 10 must be positioned relative to end 58 of door 40. To do so, jig 10 is slid lengthwise along edge 138 of door 40 until jig 10 is in the desired location for one of the upper or lower hinges. As can be seen in FIG. 1, this may be achieved through the use of gauge assembly 60. Gauge assembly 60 includes a gauge head 62, which has a T-shaped opening to receive and clamp ruler holder 66, and gauge rod 64, which bears against the end of door 40 during use. Ruler holder 66 is secured within gauge head 62 by gauge knob 68 which is screwed onto gauge stud 70. Gauge stud 70 slides through a hole in one side of the vertical member of gauge head 62 and is received in a threaded hole in the opposite side of the vertical member of gauge head 62. Further rotation of gauge knob 68 and gauge stud 70 presses the two vertical members of gauge head 62 together, thereby tightening gauge head 62 around ruler holder 66.

Ruler holder 66 contains a fixed ruler 72 and a hole 74 in the end opposite gauge head 62. Ruler 72 is attached to ruler holder 66 such that the distance from the centerline of hole 74 to the free end of gauge rod 64 is equal to the reading on ruler 72 at point 76 where ruler 72 crosses the front edge of gauge head 62. In use, rule holder 66 is slid within gauge head 62 until point 76 of gauge head 62 crosses ruler 66 at the desired measurement. Gauge knob 68 is then tightened, preventing further movement of gauge head 62. Gauge button 78 is then inserted through hole 74 and into hole 80 in body 12 of jig 10. Gauge rod 64 is then placed in contact with end 58 of door 40, thereby locating jig 10 in relation to end 58. Indexing faces 82 on body 12 help to ensure gauge assembly 60 is parallel with inside faces 54 of thumbscrews 42. While gauge assembly 60 can be made out of any suitable materials, brass, aluminum, or steel are preferred. To ensure proper alignment of the hinge member cup and the hinge mounting plate, the location of the centerline of hole 36 typically must be a distance appropriate to align the hinge mounting plate screw holes with the fixture mounting holes in the side of the cabinet (not shown). Because gauge assembly 60 is continuously adjustable, it permits location of hole 36 at any desired distance from end 58 of door 40 within the limits of ruler 72.

In a first embodiment of jig 10, illustrated in FIGS. 1, 2, 3 and 4, once hole 36 is properly positioned relative to edge 138 and end 58 of door 40, body 12 is clamped in position by clamp 84. Each clamp 84 contains a clamping arm 86 which attaches to the side of body 12 and extends under door 40. Clamping screw 88 is received in hole 90 in clamping arm 86 so that ball socket foot 92 at the end of clamping screw 88 bears against the face of door 40 opposite the holes to be drilled. Clamp 84 is used by tightening clamping screw 88 through hole 90 until foot 92 contacts the bottom face 94 of door 40, thereby frictionally holding body 12 in place.

Figure 5:
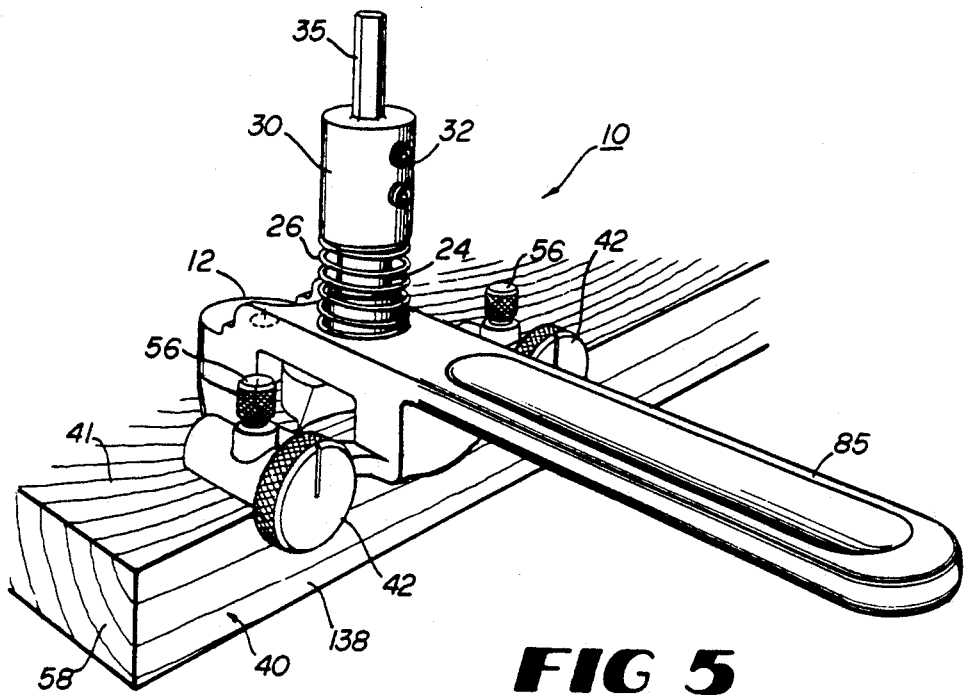
FIG. 5 is a perspective view of the second embodiment of the hinge drilling jig of the present invention positioned on a door panel to be drilled.
Figure 6:
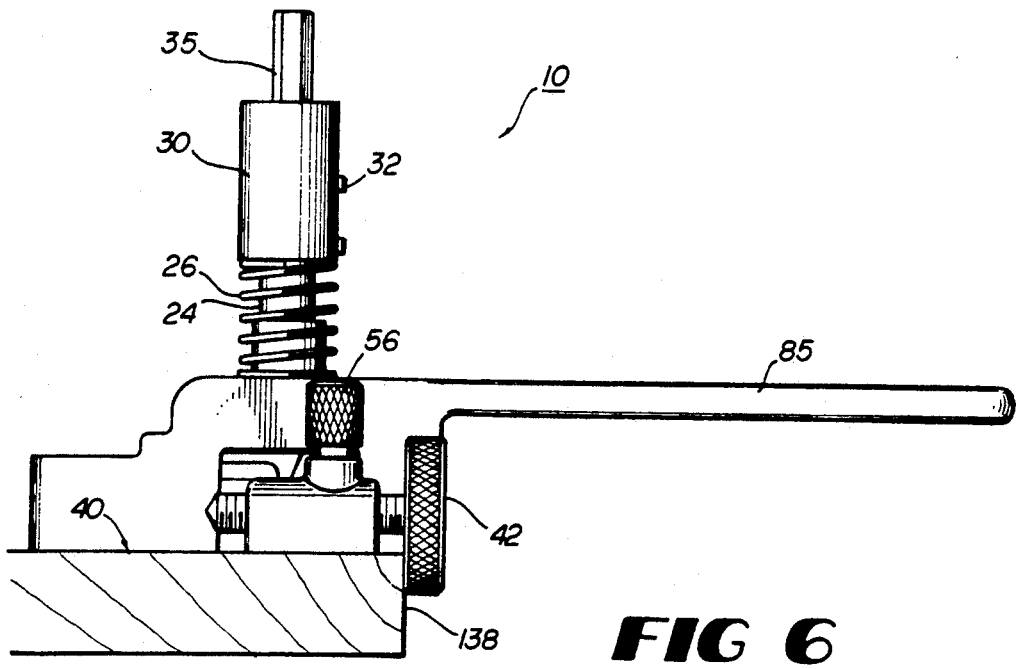
FIG. 6 is a left side elevation view of the second embodiment of the hinge drilling jig of FIG. 5.

In a second embodiment of jig 10, illustrated in FIGS. 5 and 6, body 12 is held in position by handle 85. Handle 85 eliminates the need for clamp 84 and permits door 40 to be laid flat on a work surface during use of jig 10.

To take advantage of the quick release feature of adaptor 35, the hand drill motor (not shown) used with jig 10 must be fitted with a quick release chuck capable of accepting adaptor 35 (although any chuck can be used). With the quick release chuck is inserted over adaptor 35, hole 36 can be drilled and the drill motor lifted up. Spring 26 lifts drill bit 22 out of hole 36 once the drill motor is retracted by pushing upward on collar 30.

In body 12, there are four pairs of countersinks 96. Countersinks 96 are positioned on plate 11 around bore 20 and are arranged to correspond with the hinge cup mounting screw locations of the most popular hinges available. If one of the pairs of countersinks 96 match the hinges being used, then that pair of countersinks 96 may be drilled through. Once the appropriate pair of countersinks 96 are drilled open, the hinge cup mounting screw holes are drilled in door 40 to the required depth. A countersinking drill bit containing an integral depth stop and a hex adaptor, such as the VIX ® brand drill bit, is preferred. In subsequent use, if a different hinge style is being used, another pair of the countersinks 96, which match the new hinge, may be drilled open if required. Once the hinge cup mounting screw holes have been drilled, jig 10 may now be removed from door 40, gauge assembly 60 rotated 180° to overhang the opposite side of jig 10, and jig 10 held or clamped in place at the opposite end of door 40 for the second set of hinge holes to be drilled.

If a tall door is being mounted, and requires more than two hinges, jig 10 is used in the same fashion, but is positioned for any centrally located hinges by measuring with a metric rule (not shown) to the desired location. To facilitate this measurement, a raised protrusion 98 is provided on the vertical edge of body 12, to mark the centerline of jig 10.

Flap hinges differ from regular hinges in two respects. First, the mounting screw holes are contained within the hinge member cup. Second, hole 36 actually breaks through and overlaps edge 138 of door 40. To facilitate drilling for flap hinges, spacer 100 is inserted between inside faces 54 of heads 48 of thumbscrews 42 and edge 138, as can be seen in FIG. 4. Although spacer 100 can be made of any suitable material such as aluminum or polyvinyl chloride and can be of variable size, no flap hinge currently on the market requires an overlap of more than 8 mm. Therefore, it is preferred that spacer 100 be 10 mm thick, which allows a 10 mm overlap of hole 36. If less overlap is required, thumbscrews 42 are rotated counterclockwise, with the overlap being reduced by 1 mm for each revolution of thumbscrews 42 as described above. The flap hinge itself is used as a template for drilling the mounting screw holes. Spacer 100 can also be used to properly position jig 10 when drill bit 22 is of a size other than 35 mm, such as when used with the previously discussed 26 mm bit.

This description is given for purposes of illustration and explanation. It will be apparent to those skilled in the relevant art that modifications and changes may be made to the invention as described above without departing from its scope or spirit.

We claim:

1. A hinge drilling jig for locating and drilling (1) a hinge cup hole using a first drill bit having a shank and (2) the associated hinge cup mounting screw holes using a second drill bit in a workpiece having a face and at least a first edge and a second edge perpendicular to the first edge, comprising:
   a) a jig body having a means for slideably receiving and retaining the first drill bit in the body and a means for alternatively positioning a second drill bit to drill the hinge mounting screw holes on the face of the workpiece in predetermined positions;
   b) a means for locating the jig body in continuously variable positions on the face of the workpiece relative to the first edge; and
   c) a means for stopping the depth of the hinge cup hole drilled by the first drill bit.

2. The hinge drilling jig of claim 1 further comprising a means for spacing the jig body on the face of the workpiece relative to the second edge.

3. The hinge drilling jig of claim 1 further comprising the first drill bit and a means on the first drill bit for determining a depth of the hinge cup hole to be drilled by the first drill bit prior to drilling the hinge cup hole.

4. The hinge drilling jig of claim 1 wherein the receiving and retaining means comprises a sleeve bearing mounted in the jig body to receive the shank of the first drill bit in an upright position, a hexagonal shank adaptor attached to a collar to be secured on the first drill bit and a spring to be trapped on the shank of the first drill bit by the collar.

5. The hinge drilling jig of claim 3 wherein the determining means comprises a shoulder on the shank of the first drill bit and annular rings cut into the shank of the first drill bit at spaced intervals away from the shoulder.

6. The hinge drilling jig of claim 1 wherein the locating means comprises two thumbscrews having marks received in the side of the body.

7. The drilling jig of claim 2 wherein the spacing means comprises:
   a) a measuring head;
   b) a ruler holder which is slideably captured in the measuring head and having a ruler attached thereto;
   c) a measuring rod inserted in the measuring head; and
   d) a threaded stud which tightens the measuring head around the ruler holder.

8. The hinge drilling jig of claim 1 wherein the means for alternatively positioning the second drill bit comprises a plurality of countersinks contained on the jig body.

9. A hinge drilling jig for locating and drilling a hinge cup hole and hinge cup mounting screw holes to be drilled in a workpiece having a face and at least two edges comprising:
   a) a jig body having a sleeve bearing;
   b) a drill bit having a shank slideably received in the sleeve bearing for drilling the hinge cup hole;
   c) a means for locating the position of the drill bit in continuously variable positions on the face of the workpiece relative to the first edge comprising two thumbscrews having marks received in the side of the body;
   d) a means for retaining the drill bit in the jig body comprising a collar secured on the drill bit by a plurality of setscrews and having a hexagonal shank adaptor and a spring;
   e) a means for determining a depth of the hinge cup hole to be drilled by the drill bit prior to drilling the hinge cup hole comprising a shoulder on the shank of the drill bit and annular rings cut into the shank of the drill bit at spaced intervals away from the shoulder;
   f) a means for locating the position of the hinge mounting screw holes on the face of the workpiece in predetermined positions comprising a plurality of countersinks contained on the jig body;
   g) a means for holding the jig body in position on the workpiece comprising a handle mounted on the jig body; and
   h) a means for locating the jig body on the face of the workpiece relative to the second edge comprising a measuring head, a ruler holder which is slideably captured in the measuring head and having a ruler attached thereto, a measuring rod inserted in the measuring head, and a threaded stud which tightens the measuring head around the ruler holder.

10. A hinge drilling jig for locating and drilling a hinge cup hole and hinge cup mounting screw holes to be drilled in a workpiece having a face and at least two edges comprising:
    a) a jig body having a sleeve bearing;
    b) a drill bit having a shank slideably received in the sleeve bearing for drilling the hinge cup hole;
    c) a means for locating the position of the drill bit in continuously variable positions on the face of the workpiece relative to the first edge comprising two thumbscrews having marks received in the side of the jig body;
    d) a means for retaining the drill bit in the body comprising a collar secured on the drill bit by a plurality of setscrews and having a hexagonal shank adaptor and a spring;
    e) a means for determining a depth of the hinge cup hole to be drilled by the drill bit prior to drilling the hinge cup hole comprising a shoulder on the shank of the drill bit and annular rings cut into the shank of the drill bit at spaced intervals away from the shoulder;
    f) a means for locating the position of the hinge mounting screw holes on the face of the workpiece in predetermined positions comprising a plurality of countersinks contained on the jig body;
    g) a means for holding the jig body in position on the workpiece comprising a clamp arm mounted on the jig body and containing a threaded clamping screw having a ball socket foot; and
    h) a means for locating the jig body on the face of the workpiece relative to the second edge comprising a measuring head, a ruler holder which is slideably captured in the measuring head and having a ruler attached thereto, a measuring rod inserted in the measuring head, and a threaded stud which tightens the measuring head around the ruler holder.

* * * * *

UNITED STATES PATENT AND TRADEMARK OFFICE
CERTIFICATE OF CORRECTION

PATENT NO. : 5,076,742

DATED : December 31, 1991

INVENTOR(S) : Leonard G. Lee, Frank A. McLean, Gary W. Lacoste, Timothy C. Frank, Lloyd Sevack, Darquise D. Bradette It is certified that error appears in the above-identified patent and that said Letters Patent is hereby corrected as shown below:

Column 3, line 43, between "view" and "the" --
    insert --of the first embodiment of--
    Column 3, line 53, delete "o" and insert
       --on--

Signed and Sealed this

Twenty-seventh Day of April, 1993

Attest:

MICHAEL K. KIRK

Attesting Officer

Acting Commissioner of Patents and Trademarks